(12) United States Patent
Shida

(10) Patent No.: US 8,908,629 B2
(45) Date of Patent: Dec. 9, 2014

(54) BANDWIDTH RESERVATION APPARATUS, BANDWIDTH RESERVATION METHOD, COMMUNICATION APPARATUS, AND COMMUNICATION SYSTEM

(75) Inventor: Tetsuro Shida, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 156 days.

(21) Appl. No.: 13/811,558

(22) PCT Filed: Jun. 6, 2011

(86) PCT No.: PCT/JP2011/003176
§ 371 (c)(1),
(2), (4) Date: Jan. 22, 2013

(87) PCT Pub. No.: WO2012/042703
PCT Pub. Date: Apr. 5, 2012

(65) Prior Publication Data
US 2013/0232532 A1    Sep. 5, 2013

(30) Foreign Application Priority Data

Sep. 28, 2010  (JP) ................................ 2010-217375

(51) Int. Cl.
| | | |
|---|---|---|
| *H04L 12/50* | (2006.01) | |
| *H04L 12/825* | (2013.01) | |
| *H04L 29/06* | (2006.01) | |
| *H04N 21/61* | (2011.01) | |
| *H04L 12/917* | (2013.01) | |
| *H04L 12/927* | (2013.01) | |
| *H04L 12/911* | (2013.01) | |

(52) U.S. Cl.
CPC ............ *H04N 21/6106* (2013.01); *H04L 47/25* (2013.01); *H04L 65/80* (2013.01); *H04L 65/4069* (2013.01); *H04L 47/801* (2013.01); *H04L 47/824* (2013.01); *H04L 47/76* (2013.01)
USPC .............. 370/329; 370/436; 370/477; 725/95

(58) Field of Classification Search
None
See application file for complete search history.

(56) References Cited

U.S. PATENT DOCUMENTS

| | | | | |
|---|---|---|---|---|
| 6,771,661 | B1 * | 8/2004 | Chawla et al. | 370/468 |
| 6,804,227 | B1 * | 10/2004 | Sone et al. | 370/368 |
| 7,664,126 | B2 * | 2/2010 | Funato | 370/412 |
| 2008/0219176 | A1 * | 9/2008 | Yamada | 370/252 |

FOREIGN PATENT DOCUMENTS

| | | |
|---|---|---|
| JP | 6-30021 A | 2/1994 |
| JP | 7-95214 A | 4/1995 |

(Continued)

*Primary Examiner* — Anh-Vu Ly
*Assistant Examiner* — Hashim Bhatti
(74) *Attorney, Agent, or Firm* — Birch, Stewart, Kolasch & Birch, LLP

(57) ABSTRACT

A bandwidth reservation apparatus and bandwidth reservation method that enable a communication apparatus to quickly begin and stably carry out a data transmission, and a communication apparatus and communication system including the bandwidth reservation apparatus. The bandwidth reservation apparatus includes: a transmit data buffer unit; a bit rate reporting unit; a first reserved bandwidth quantity calculating unit that calculates a first reserved bandwidth quantity required for the transmission on the communication network; a second reserved bandwidth quantity calculating unit that calculates a second reserved bandwidth quantity that is additionally acquired so as to compensate for a shortage of transmission bandwidth that occurs during an interval from a time when the bit rate of the transmit data changes until the first reserved bandwidth quantity can be reserved; and a bandwidth reservation control unit that reserves a combined reserved bandwidth quantity obtained by combining the first and second reserved bandwidth quantities.

10 Claims, 5 Drawing Sheets

(56) References Cited

FOREIGN PATENT DOCUMENTS

| | | |
|---|---|---|
| JP | 2003-169310 A | 6/2003 |
| JP | 2005-236416 A | 9/2005 |
| JP | 2009-89295 A | 4/2009 |
| JP | 2009-89404 A | 4/2009 |
| JP | 2009-278250 A | 11/2009 |
| JP | 2010-206378 A | 9/2010 |

* cited by examiner

BANDWIDTH RESERVATION APPARATUS, BANDWIDTH RESERVATION METHOD, COMMUNICATION APPARATUS, AND COMMUNICATION SYSTEM

TECHNICAL FIELD

The present invention relates to a bandwidth reservation apparatus and bandwidth reservation method in a communication system that reserves the bandwidth necessary for data transmission and then carries out communication, and to a communication apparatus and communication system including this type of bandwidth reservation apparatus.

BACKGROUND ART

The need to transmit real-time sensitive content such as audio and video over communication networks has been increasing in recent years and there is a need to secure bandwidth and QoS (Quality of Service) that can satisfy the requisites related to transmission of the content. Particularly in a network environment with limited available bandwidth, when multiple communication devices transmit data with QoS assurance, to avoid collisions between the data, a bandwidth allocation process is carried out to apportion and allocate the bandwidth and time used for data transmission.

If the bandwidth allocation process is initiated after the appearance of data to transmit, however, the start of data transmission is delayed by the time required for the bandwidth allocation process, so users have not been able to enjoy a pleasant communication environment. Technology is therefore needed for shortening the time required for the bandwidth allocation process and providing the user with a pleasant communication environment.

A proposed technique for shortening the time required for the bandwidth allocation process is to preset the time and required bandwidth of a data transmission requested by the user and rapidly allocate the bandwidth needed for the data transmission, which occurs at the reserved time (see, for example, Patent Reference 1).

PRIOR ART REFERENCES

Patent References

Patent reference 1: Japanese Patent Application Publication No. H6-30021

SUMMARY OF THE INVENTION

Problems to be Solved by the Invention

As described above, a problem is that users have not been able to enjoy a pleasant communication environment when the bandwidth allocation process is initiated after the appearance of data to transmit, because the start of data transmission is delayed by the time required for the bandwidth allocation process.

To be able to start data transmission immediately after the appearance of data to transmit, there is a need to store transmit data in a transmit data buffer in the transmitting device before the transmit data are transmitted to the communication network, but because the size of the transmit data buffer is generally finite, there is the possibility that an overflow may occur, destabilizing the communication.

When parameters such as the bandwidth needed for data transmission and the duration of its use are predetermined, the technology according to Patent Reference 1 is practicable, but another problem is that users have also not been able to enjoy a pleasant communication environment when the reservation process fails to be carried out in advance (for example, when data to transmit appear unexpectedly, or when the bit rate of the transmit data changes), because processes such as the checking of available bandwidth and the acquisition of reserved bandwidth then have to be carried out in the interval from the time of appearance of the transmit data until the start of data transmission.

The present invention addresses the problems of the prior art described above with the object of providing a bandwidth reservation apparatus and bandwidth reservation method that enable a communication apparatus to quickly begin and stably carry out a data transmission, and a communication apparatus and communication system including this type of bandwidth reservation apparatus.

Means for Solving the Problem

In a communication system that transmits transmit data over a communication network that performs bandwidth-reservation-type media access control, a bandwidth reservation apparatus that reserves transmission bandwidth for transmitting the transmit data over the communication network according to an aspect of the invention includes: a transmit data buffer unit for temporarily storing the transmit data for an interval from a time when the transmit data are input to a time when the transmit data are transmitted to the communication network; a bit rate reporting unit for reporting a bit rate of the transmit data; a first reserved bandwidth quantity calculating unit for calculating, from the bit rate of the transmit data, a first reserved bandwidth quantity required for transmission on the communication network; a second reserved bandwidth quantity calculating unit for calculating a second reserved bandwidth quantity that is additionally acquired so as to compensate for a shortage of transmission bandwidth that occurs during a bandwidth acquisition delay time from a time when the bit rate of the transmit data changes until the first reserved bandwidth quantity can be reserved; and a bandwidth reservation control unit for reserving a combined reserved bandwidth quantity obtained by combining the first and second reserved bandwidth quantities.

In a communication system that transmits transmit data over a communication network that performs bandwidth-reservation-type media access control, a bandwidth reservation method that reserves transmission bandwidth for transmitting the transmit data over the communication network according to an aspect of the invention includes: a step of temporarily storing the transmit data in a transmit data buffer unit for an interval from a time when the transmit data are input to a time when the transmit data are transmitted to the communication network; a step of reporting a bit rate of the transmit data; a step of calculating, from the bit rate of the transmit data, a first reserved bandwidth quantity required for transmission on the communication network; a step of calculating a second reserved bandwidth quantity that is additionally acquired so as to compensate for a shortage of transmission bandwidth that occurs during a bandwidth acquisition delay time from a time when the bit rate of the transmit data changes until the first reserved bandwidth quantity can be reserved; and a step of reserving a combined reserved bandwidth quantity obtained by combining the first and second reserved bandwidth quantities.

Effects of the Invention

The bandwidth reservation apparatus and bandwidth reservation method according to an aspect of the present invention, and the communication apparatus and communication system including this type of bandwidth reservation apparatus, enable a communication apparatus to quickly begin and stably carry out a data transmission.

MODE FOR CARRYING OUT THE INVENTION

Figure 1:
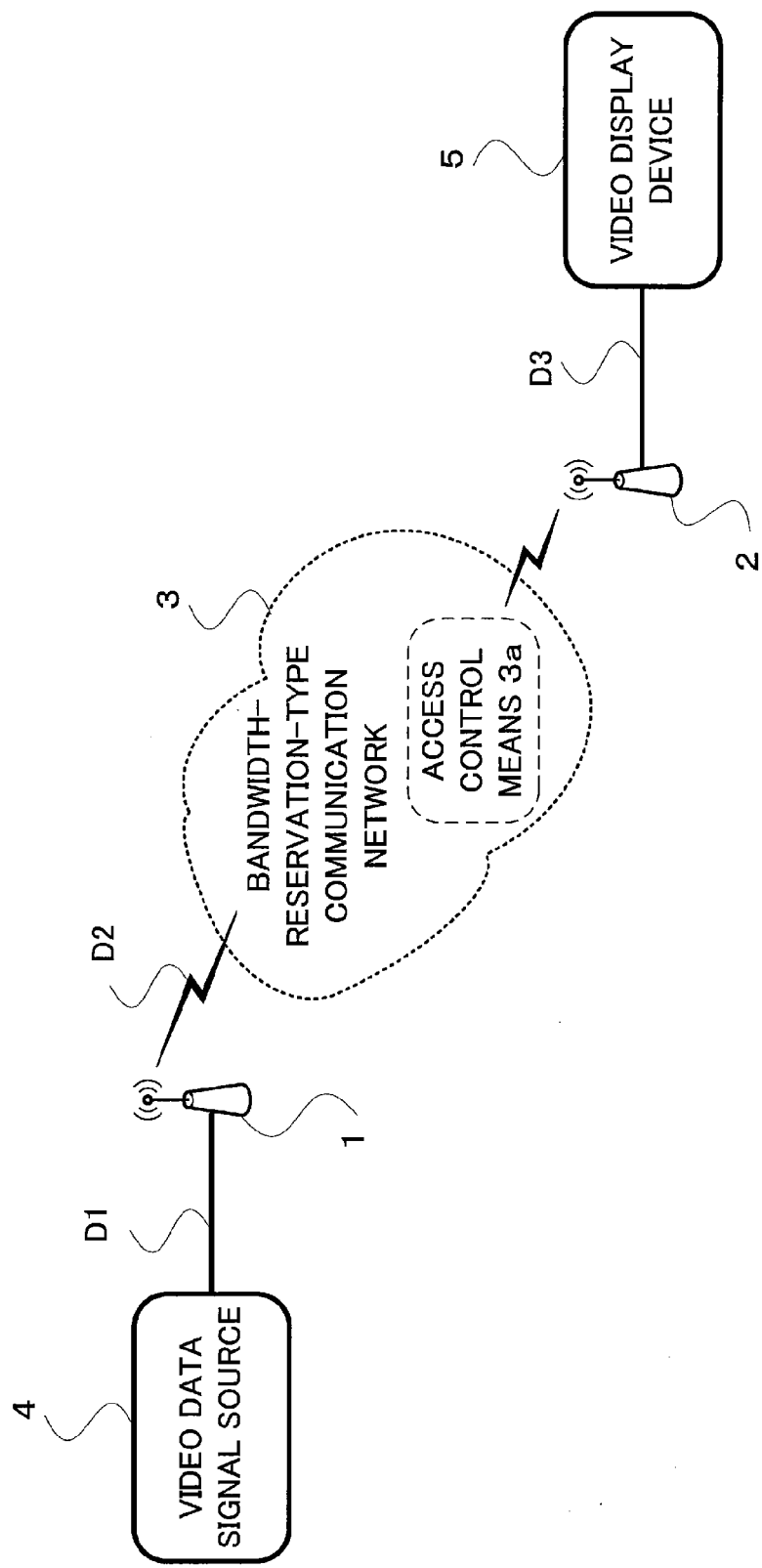
FIG. 1 is a diagram schematically illustrating the configuration of a communication system capable of implementing a bandwidth reservation method according to an embodiment of the invention.

FIG. 1 is a diagram schematically illustrating the configuration of a communication system capable of implementing a bandwidth reservation method according to an embodiment of the invention. The communication system shown in FIG. 1 has a transmitting device 1 as a communication device, a receiving device 2 as another communication device, a communication network 3, a video data signal source 4, and a video display device 5. The configuration of the communication system according to the embodiment, however, is not limited to the example shown in FIG. 1; numerous variations are possible, such as a configuration without a video display device 5.

The communication network 3 has means for performing bandwidth-reservation-type media access control (for example, the access control means 3a shown in FIG. 1). Real-time sensitive content data such as audio and video data (referred to below as video data) D1 are input to the transmitting device 1 from the video data signal source 4, and transmit data D2 including these video data D1 are transmitted to the receiving device 2 over the communication network 3. The receiving device 2 outputs data D3 based on the video data D1 included in the received transmit data D2 to the video display device 5. The video display device 5 reproduces a video picture from the received data D3 and displays the reproduced video picture. The data supplied to the transmitting device 1 by the video data signal source 4 may, incidentally, be transmit data other than video data, or transmit data including video data and data other than video data. The video display device 5 may be a device that carries out a process other than video display, provided the process is based on the transmitted signal received by the receiving device 2.

The communication network 3 may be a network that uses any communication system, provided the network uses a communication system in which bandwidth-reservation-type media access control is performed. In the embodiment of the invention, the communication network 3 uses the UWB (Ultra Wideband) wireless communication system specified as standards ECMA-368 and ECMA-369 (ECMA: European Computer Manufacturers Association). This wireless communication system is equivalent to the WiMedia standard specified by the WiMedia Alliance.

Figure 2:
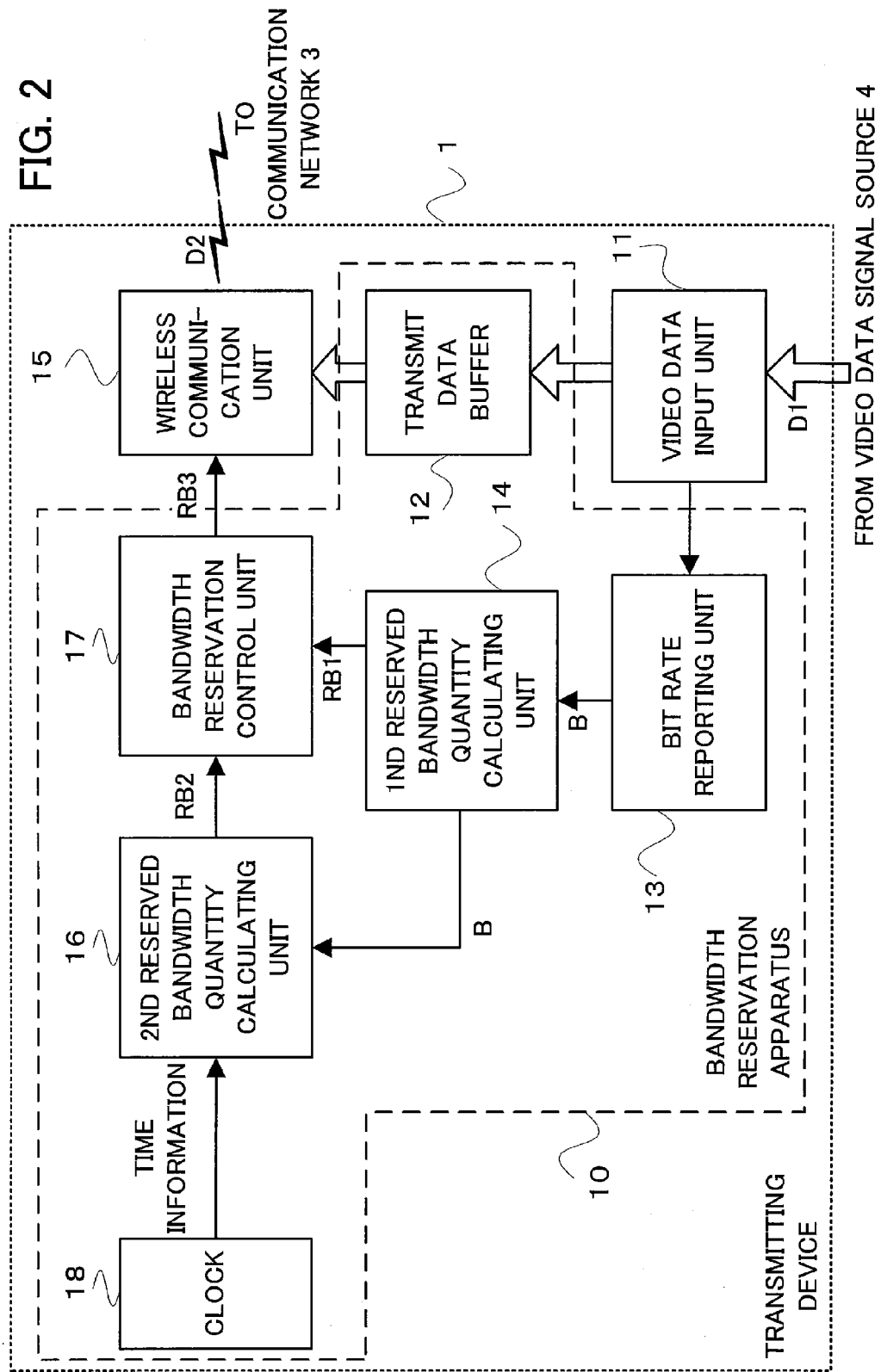
FIG. 2 is a block diagram schematically illustrating the configuration of a transmitting device including a bandwidth reservation apparatus capable of implementing the bandwidth reservation method according to the embodiment.

FIG. 2 is a block diagram schematically illustrating the configuration of a transmitting device 1 including a bandwidth reservation apparatus 10 capable of implementing the bandwidth control method according to the embodiment of the invention. As shown in FIG. 2, the transmitting device 1 has a video data input unit 11 that receives the video data D1 output from the video data signal source 4, a transmit data buffer 12 that temporarily stores the video data input to the video data input unit 11, and a bit rate reporting unit 13 that reports the bit rate B (also denoted B(t), where t represents time) of the video data input to the video data input unit 11 as bit rate information. The transmitting device 1 has a first reserved bandwidth quantity calculating unit 14 that calculates a first reserved bandwidth quantity RB1 (also denoted RB1(t)) on the communication network 3 from the bit rate B(t) reported from the bit rate reporting unit 13, a wireless communication unit 15 that carries out a communication process between the wireless communication unit 15 and the communication network 3, and a second reserved bandwidth quantity calculating unit 16 that calculates an additional second reserved bandwidth quantity RB2 (also denoted RB2(t) from a change in the bit rate B(t) reported from the bit rate reporting unit 13. The transmitting device 1 also has a bandwidth reservation control unit 17 that gives the wireless communication unit 15 instructions concerning bandwidth reservation control on the communication network 3, based on the first reserved bandwidth quantity RB1(t) reported from the first reserved bandwidth quantity calculating unit 14 and the second reserved bandwidth quantity RB2(t) reported from the second reserved bandwidth quantity calculating unit 16, and a clock 18 that provides time information. The transmit data buffer 12, bit rate reporting unit 13, first reserved bandwidth quantity calculating unit 14, second reserved bandwidth quantity calculating unit 16, bandwidth reservation control unit 17, and clock 18 constitute the bandwidth reservation apparatus 10 capable of implementing the bandwidth reservation method according to the embodiment.

The video data input unit 11 receives the video data D1 output from the video data signal source 4. The video data signal source 4 can output a plurality of video data with different bit rates. The video data signal source 4 can output, for example, both HD (High Definition) video data and SD (Standard Definition) video data. The video data signal source 4 can switch the output video data over to either HD video data or SD video data on the basis of a user operation, for example, or according to a predetermined schedule.

The transmit data buffer 12 is a FIFO (First In First Out) buffer that temporarily stores video data input from the video data input unit 11 as transmit data for the interval until the video data are transmitted from the wireless communication unit 15 to the receiving device 2 over the communication network 3. When transmission conditions on the communication network 3 are favorable, the wireless communication unit 15 sends the transmit data buffer 12 a request for output of the video data; on receiving this output request, the transmit data buffer 12 sends the stored video data to the wireless communication unit 15. When data transmission cannot be carried out because of worsened transmission conditions on the communication network 3 or for some other reason, the video data remain stored in the transmit data buffer 12 until the wireless communication unit 15 requests output of the video data. If the video data input unit 11 then continues receiving video data D1, the amount of video data stored (the amount of data remaining) in the transmit data buffer 12 increases.

The bit rate reporting unit 13 reports the bit rate B(t) of the video data input to the video data input unit 11 to the first reserved bandwidth quantity calculating unit 14 and second reserved bandwidth quantity calculating unit 16. When the video data input unit 11 receives the video data from the video data signal source 4, the bit rate B(t) of the video data can be measured in, for example, an input interface (not shown) by counting the amount of data input during a certain interval.

Instead of having the amount of data counted in an input interface (not shown), when information about the bit rate of the video data is provided in data accompanying the video data, an alternative method may be used: this bit rate information may be extracted and reported to the first reserved bandwidth quantity calculating unit 14 and second reserved bandwidth quantity calculating unit 16.

The first reserved bandwidth quantity calculating unit 14 calculates the quantity of bandwidth required for transmission of the video data with the bit rate B(t) reported by the bit rate reporting unit 13, based on the packet error rate of video data transmission on the communication network 3 reported by the wireless communication unit 15.

First, if no communication errors are assumed to occur on the communication network 3, a quantity of transmission bandwidth equivalent to the bit rate B(t) reported by the bit rate reporting unit 13 must be secured in order to transmit the video data over the communication network 3. If, for example, the bit rate B(t) of the video data is reported to be 20 Mbps, the quantity of transmission bandwidth needed for the data transmission is 20 Mbps.

In communication networks in general, however, communication errors may occur, so the packet error rate is equal to or greater than zero. When a packet error occurs, the packet is resent, increasing the quantity of transmission bandwidth needed for the data transmission. When a packet error occurs, there is generally a need to wait for a separately established time to elapse (a penalty time P) before starting the resending process. If the packet error rate is denoted PER (0≤PER<1) here, the quantity of transmission bandwidth needed for the data transmission is given by a geometric series with a common ratio of PER. If the number of retries is unlimited, the quantity of transmission bandwidth needed for the data transmission is given by an infinite series with a common ratio of PER.

Therefore, the transmission bandwidth quantity $A_0$ needed for the data transmission can be expressed by the following equation (1), using the reported bit rate B, the penalty time P, and the packet error rate PER.

$$A_0 = B \times \frac{1}{1-PER} + P \times \frac{PER}{1-PER} \qquad (1)$$

The first reserved bandwidth quantity calculating unit 14 requests the bandwidth reservation control unit 17 to reserve the transmission bandwidth quantity &calculated in equation (1) as the first reserved bandwidth quantity (first bandwidth reservation request quantity) RB1.

The wireless communication unit 15 transmits the data to the receiving device 2 over the communication network 3. The communication network 3 may operate according to any wireless communication standard in which media access control is carried out by bandwidth reservation, but the description given here is for a wireless communication system operating according to the ECMA-368 standard.

Figure 3:
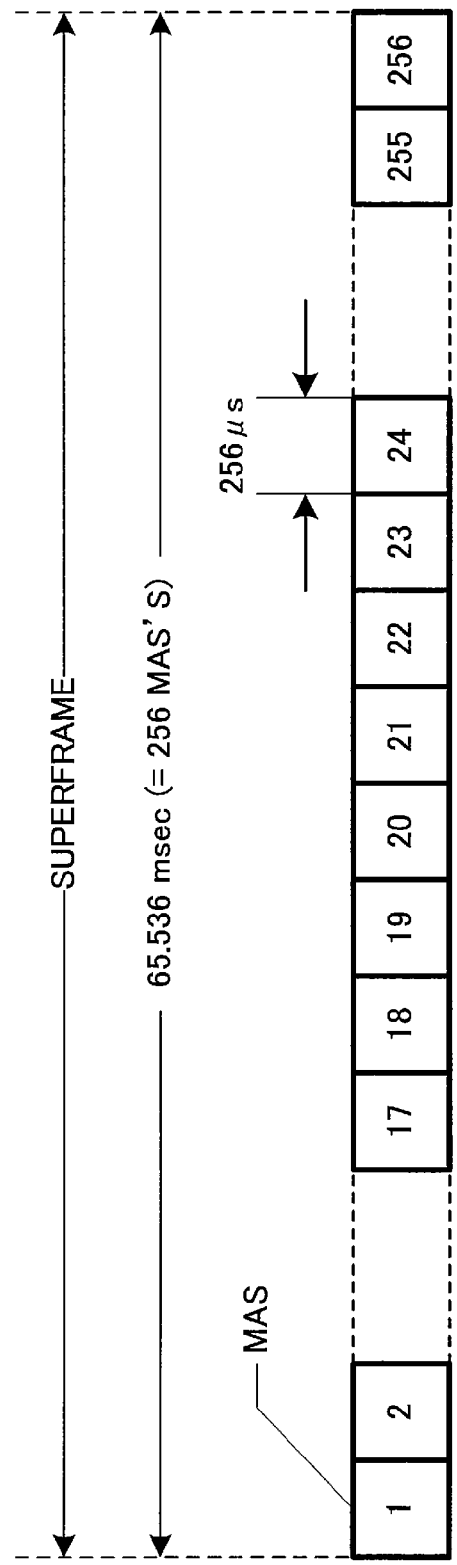
FIG. 3 is a diagram illustrating a superframe configuration based on the ECMA-368 standard.

In an ECMA-368 wireless communication system, as shown in FIG. 3, periodic intervals of 65.536 msec constitute respective superframes. These periodic intervals are the basic time units used for synchronization of different communication devices residing in the same network. A superframe consists of 256 timeslots, each referred to as a MAS (Media Access Slot). For data transmission such as video data transmission in which there is little fluctuation in communication volume and it is desirable to avoid collisions with other communications, stable data transmission can be realized by reserving bandwidth on a MAS basis.

The wireless communication unit 15 determines the optimum transmission rate in the physical layer (the physical data rate) from such indicators of communication quality as the received signal strength and the packet errorrate. In the ECMA-368 standard, the physical data rate can be selected from among eight values: 53.3 Mbps, 80 Mbps, 106.7 Mbps, 160 Mbps, 200 Mbps, 320 Mbps, 400 Mbps, and 480 Mbps.

The wireless communication unit 15 reports the selected physical data rate PDR to the bandwidth reservation control unit 17. The bandwidth reservation control unit 17 calculates the number of MAS's in which video data with the bit rate B reported by the wireless communication unit 15 can be transmitted at the physical data rate PDR.

First, the ratio $R_0$ of the transmission bandwidth required for transmission of the transmit data received in the video data input unit 11 to the receiving device 2 to the total communication capacity of the communication network 3 is obtained from the following equation (2).

$$R_0 = \left( B \times \frac{1}{1-PER} + P \times \frac{PER}{1-PER} \right) \times \frac{1}{PDR} \qquad (2)$$

Since there are 256 MAS's in a superframe, the necessary number of MAS's is at least the value $N_0$ obtained from the following equation (3).

$$N_0 = \left( B \times \frac{1}{1-PER} + P \times \frac{PER}{1-PER} \right) \times \frac{1}{PDR} \times 256 \qquad (3)$$

Since actual bandwidth reservations are made on a MAS basis, the bandwidth reservation control unit 17 reserves a bandwidth equal to the number of MAS's obtained by rounding up the fractional part of the value $N_0$ obtained from equation (3).

If, for example, the bit rate B of the video data is 20 Mbps, the physical data rate PDR is 200 Mbps, and the packet error rate PER is 0.1, the value $N_1$ giving the necessary number of MAS's can be calculated as follows by using equation (3).

$$N_1 = 20 \times (1/(1-0.1)) + 200 \times 256 \approx 28.4$$

Here, the penalty time P is zero. Rounding up the fractional part of the calculated value (approximately 28.4) gives 29. Consequently, it has been calculated that 29 MAS's must be reserved.

The bandwidth reservation control unit 17 calculates the number of MAS's required for transmission of the video data as described above, and requests the wireless communication unit 15 to reserve the calculated number of MAS's as the first reserved bandwidth quantity.

The second reserved bandwidth quantity calculating unit 16 calculates a reserved bandwidth compensation quantity C(t). The reserved bandwidth compensation quantity C(t) is a data quantity calculated by integrating the difference between the first reserved bandwidth quantity RB1(t) calculated by the first reserved bandwidth quantity calculating unit 14 and the bit rate B(t) of the video data input to the video data input unit 11 over an interval T12 from a time t1 at which the bit rate B(t) of the video data input to the video data input unit 11 changes to a time t2 at which the reserved bandwidth quantity calculated by the first reserved bandwidth quantity calculating unit 14 is obtained on the communication network 3. This data quantity corresponds to the square hatched area of {(B1b−RB1a)×T12} in FIG. 4 or FIG. 6.

The reserved bandwidth compensation quantity C(t) is a value giving the amount of excess or shortage of reserved bandwidth obtained on the communication network 3 in comparison with the bit rate B(t) of the video data during the interval from time t1 to time t2. A positive reserved bandwidth compensation quantity C(t) indicates that there has been a shortage of reserved bandwidth; a negative reserved bandwidth compensation quantity C(t) indicates that there has been an excess of reserved bandwidth.

If the first reserved bandwidth quantity at time t is RB1(t) and the bit rate of the video data at time t is B(t), the reserved bandwidth compensation quantity C(t) can be calculated by the following equation (4).

$$C(t) = \int_{t1}^{t2} (B(t) - RB1(t))dt \qquad (4)$$

Figure 4:
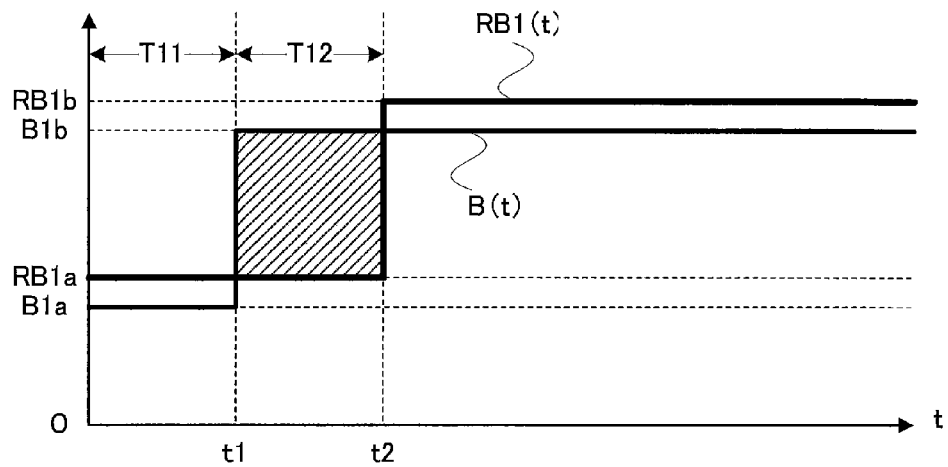
FIG. 4 shows exemplary temporal changes in the bit rate of video data input to the bandwidth reservation apparatus according to the embodiment and the first reserved bandwidth quantity.

FIG. 4 shows exemplary temporal changes in the bit rate B(t) of video data input to the bandwidth reservation apparatus 10 according to the embodiment and the first reserved bandwidth quantity RB1(t). The vertical axis in FIG. 4 indicates the bit rate B(t) of the video data and the first reserved bandwidth quantity RB1(t); the horizontal axis indicates time t. In FIG. 4, B1a is the bit rate (during interval T11) before the bit rate of the video data changes, B1b is the bit rate after the bit rate of the video data has changed, RB1a is the first reserved bandwidth quantity based on the video data before the time t1 of the bit rate change, and RB1b is the first reserved bandwidth quantity based on the video data after the time t1 of the bit rate change. Time t1 is the time at which the bit rate of the video data changes; time t2 is the time at which the reserved bandwidth quantity RB1(t) based on the video data after the bit rate has changed is obtained on the communication network 3.

In FIG. 4, the bit rate of the video data changes from B1a to B1b at time t1, and the quantity of bandwidth obtained on the communication network 3 changes from RB1a to RB1b at time t2.

Figure 5:
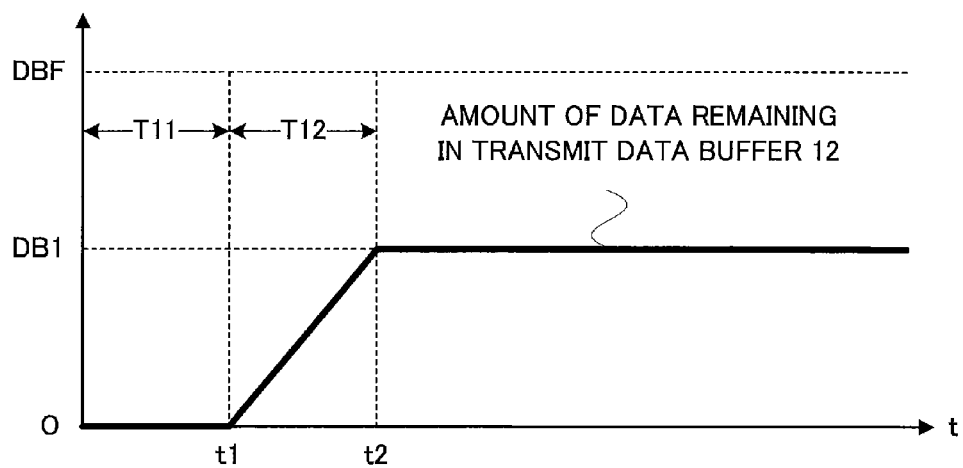
FIG. 5 shows an exemplary temporal change in the amount of data remaining in the transmit data buffer in the bandwidth reservation apparatus according to the embodiment.

FIG. 5 shows an exemplary temporal change in the amount of data remaining in the transmit data buffer 12 in the bandwidth reservation apparatus 10 according to the embodiment. Before time t1 (during interval T11), the amounts of data input to and output from the transmit data buffer 12 are in balance, so the amount of data remaining in the transmit data buffer 12 stays at substantially zero, barring an exceptionally long-lasting communication problem. When the bit rate B(t) of the video data changes at time t1, causing a shortage of reserved transmission bandwidth, the amount of data input exceeds the amount of the data output from the transmit data buffer 12, so the amount of data remaining in the transmit data buffer 12 starts to increase. The amount of data remaining in the transmit data buffer 12 continues to increase (during interval T12) until the time t2 at which the first reserved bandwidth quantity calculated by the first reserved bandwidth quantity calculating unit 14 is obtained on the communication network 3. After time t2, the amounts of data input to and output from the transmit data buffer 12 are in balance, so the amount of data remaining in the transmit data buffer 12 hardly changes at all.

With the increased amount of data remaining in the transmit data buffer 12, withstanding unexpected long-lasting communication problems becomes more difficult. If the maximum amount of data that can be stored in the transmit data buffer 12 is DBF and the amount of data remaining in the transmit data buffer 12 is DB1, the quotient obtained by dividing the difference between DBF and DB1 by the bit rate of the video data is the time over which the system can withstand a communication problem. For example, the time E1 over which the system can withstand a communication problem before time t1 in FIG. 5 can be calculated by the following equation (5), $$E1 = DBF \div B1b \qquad (5)$$

and the time E2 during which the system can withstand a communication problem after time t2 can be calculated by the following equation (6).

$$E2 = (DBF - DB1) \div B1b \qquad (6)$$

Therefore, the condition shown in FIG. 5, in which the amount of data remaining in the transmit data buffer 12 does not decrease after time t2, is undesirable because the inability to withstand lengthy communication downtime creates a risk of unstable transmission (also a problem in the prior art). The transmitting device 1 according to the embodiment reduces the amount of data remaining in the transmit data buffer 12 quickly by obtaining the second reserved bandwidth quantity RB2(t) calculated by the bandwidth reservation control unit 17. The process will be described below.

First, the method of calculating the second reserved bandwidth quantity RB2(t) in the second reserved bandwidth quantity calculating unit 16 will be described. The greater the second reserved bandwidth quantity RB2(t) is, the more quickly the amount of data remaining in the transmit data buffer 12 can be reduced. Therefore, the second reserved bandwidth quantity calculating unit 16 may set the maximum transmission bandwidth that can be reserved on the communication network 3 as the second reserved bandwidth quantity RB2(t). In other words, the second reserved bandwidth quantity calculating unit 16 may set a second reserved bandwidth quantity RB2(t) so as to reserve every unreserved MAS on the communication network 3.

A disadvantage, however, is that if the second reserved bandwidth quantity RB2(t) is set to a large value and this bandwidth is reserved, the number of MAS's left unreserved on the communication network 3 decreases and it becomes difficult to reserve bandwidth for other data communication using the same communication network 3. Therefore, the second reserved bandwidth quantity calculating unit 16 may calculate the product obtained by multiplying the maximum transmission bandwidth that can be reserved on the communication network 3 by a predetermined percentage A (where 0<A<100 (unit: %)) as the second reserved bandwidth quantity RB2(t). Because (100−A)% of the maximum transmission bandwidth that can be reserved on the communication network 3 then remains unreserved, it remains possible for other data communication sharing the communication network 3 to reserve bandwidth.

Alternatively, the second reserved bandwidth quantity calculating unit 16 may calculate a predetermined quantity of bandwidth as the second reserved bandwidth quantity RB2(t). This also allows unreserved transmission bandwidth to remain, so that it remains possible for other data communication sharing the communication network 3 to reserve bandwidth.

The first reserved bandwidth quantity RB1(t) calculated by the first reserved bandwidth quantity calculating unit 14 and the second reserved bandwidth quantity RB2(t) calculated by the second reserved bandwidth quantity calculating unit 16 are both reported to the bandwidth reservation control unit 17, which reserves the sum obtained by adding the first and second reserved bandwidth quantities RB1(t) and RB2(t) as a combined reserved bandwidth quantity RB3(t).

Figure 6:
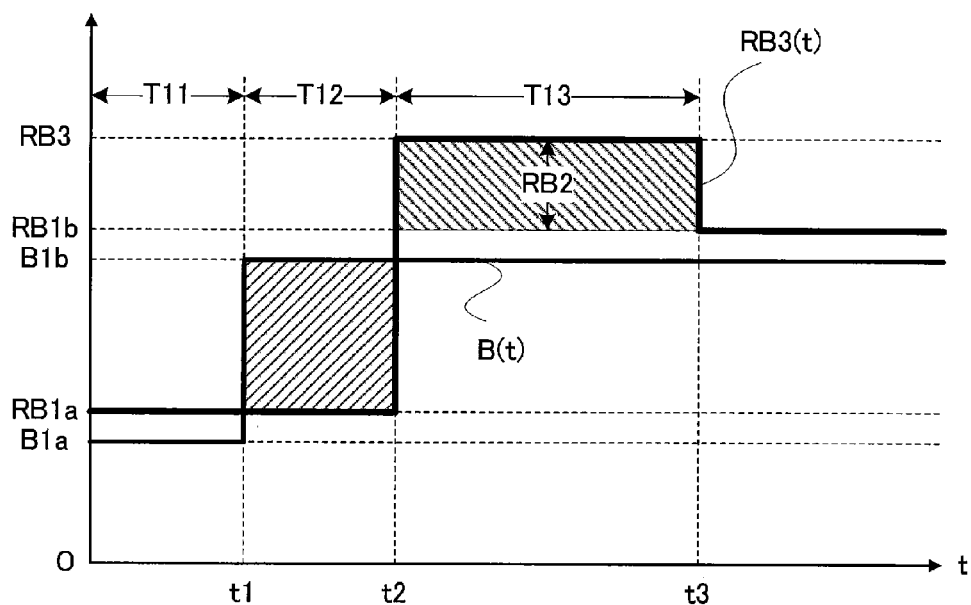
FIG. 6 shows exemplary temporal changes in the bit rate of video data input to the bandwidth reservation apparatus according to the embodiment and the combined reserved bandwidth quantity.

FIG. 6 shows exemplary temporal changes in the bit rate B(t) of video data input to the bandwidth reservation apparatus 10 according to the embodiment and temporal changes in the combined reserved bandwidth quantity RB3(t). The combined reserved bandwidth quantity RB3(t) is the sum of the first and second reserved bandwidth quantities RB1(t) and RB2(t). In FIG. 6, the vertical axis indicates the bit rate B(t) of the video data and the combined reserved bandwidth quantity RB3(t); the horizontal axis indicates time t. The value B1$a$ in FIG. 6 is the bit rate before the bit rate of the video data changes (more specifically, the bit rate during the interval T11 before time t1), and the value B1$b$ is the bit rate after the bit rate of the video data has changed (more specifically, the bit rate after time t1). The value RB1$a$ in FIG. 6 is the first reserved bandwidth quantity based on the video data before the bit rate changes, and the value RB1$b$ is the first reserved bandwidth quantity RB1(t) based on the video data after the bit rate changes. RB2(t) is the second reserved bandwidth quantity during the interval T13 from time t2 to time t3, and RB3(t) is the combined bandwidth quantity RB3 during the interval T13 from time t2 to time t3.

Time t1 is the time at which the bit rate of the video data changes; time t2 is the time at which the reserved bandwidth quantity RB1(t) based on the video data after the bit rate has changed is obtained on the communication network 3.

In FIG. 6, during the interval T12 from time t1 to time t2, there is a shortage of reserved transmission bandwidth in comparison with the bit rate; the amount of this shortage (also referred to as the transmission bandwidth shortage quantity) is (B1$b$−RB1$a$). The data quantity (corresponding to the hatched area during an interval from time t1 to time t2 in FIG. 6) calculated by integrating the shortage quantity of the transmission bandwidth over the interval from time t1 to time t2 is equal to the amount of data remaining in the transmit data buffer 12. The amount of data remaining in the transmit data buffer 12 increases until time t2. The amount of data remaining in the transmit data buffer 12 at time t2 is DB1.

The amount of data that accumulates in the transmit data buffer 12 from time t1 to time t2 is identical to the reserved bandwidth compensation quantity described above. When the transmission bandwidth is increased by additionally obtaining transmission bandwidth equivalent to this reserved bandwidth compensation quantity, the amount of data stored in the transmit data buffer 12, after accumulating from time t1 to time t2, is reduced.

The interval T13 over which to obtain the additional second reserved bandwidth quantity RB2(t) can accordingly be calculated by dividing the reserved bandwidth compensation quantity by the second reserved bandwidth quantity RB2(t). The second reserved bandwidth quantity calculating unit 16 recognizes time t2 from a notification received from the bandwidth reservation control unit 17 and uses the clock 18 to measure interval T13. If the second reserved bandwidth quantity RB2(t) is obtained starting from time t2, then the second reserved bandwidth quantity RB2(t) is obtained from time t2 until the time t3 at which interval T13 has elapsed. The hatched area in the interval from time t1 to time t2 in FIG. 6 is equal to the hatched area in the interval from time t2 to time t3; this relationship is used to obtain time t3.

Figure 7:
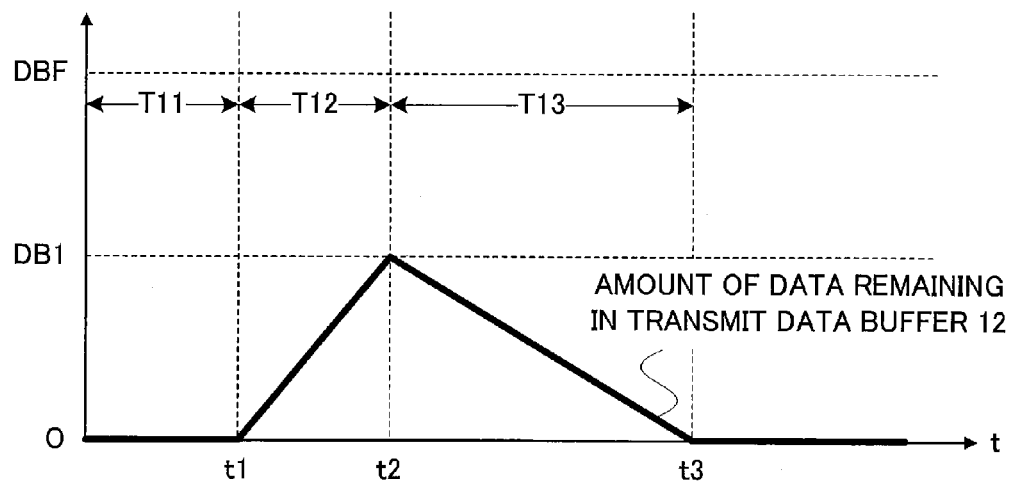
FIG. 7 shows an exemplary temporal change in the amount of data remaining in the transmit data buffer of the bandwidth reservation apparatus according to the embodiment.

FIG. 7 is a diagram illustrating the amount of data remaining in the transmit data buffer 12. In FIG. 7, the vertical axis indicates the accumulated amount of data (the remaining amount of data) in the transmit data buffer 12; the horizontal axis indicates time. FIG. 7 illustrates a case in which the amount of data remaining in the transmit data buffer 12 increases during the interval T12 from time t1 until time t2, reaches the value DB1 at time t2, decreases during the interval T13 from time t2 to time t3, and becomes zero at time t3. As shown in FIG. 7, after increasing, the amount of data remaining in the transmit data buffer 12 is reduced quickly because of the additional transmission bandwidth obtained as the second reserved bandwidth quantity RB2(t), and reaches zero at time t3, thereby restoring the capability to withstand communication problems.

Even in the event of unexpected transmit data or a change in the bit rate B(t) of the transmit data, by reserving, in the interval (for example, interval T12) from the time of occurrence of the event (for example, time t1) until the time (for example, time t2) at which the bandwidth reservation process is completed and the transmit data can be transmitted on the communication network, additional transmission bandwidth (for example, the hatched area during interval T13 in FIG. 6) equivalent to the amount of transmit data, the bandwidth reservation apparatus and bandwidth reservation method according to the embodiment quickly reduce the amount of data remaining in the transmit data buffer 12 used for the transmission of data, as shown in FIG. 7, making it more difficult for an overflow from the transmit data buffer 12 to occur, thus enabling stable transmission of the transmit data.

The bandwidth reservation apparatus and bandwidth reservation method according to the embodiment can be applied to communication systems such as, for example, wireless audio-video transmission systems that transmit video data input at a fixed bit rate, such as audio and video data, from a transmitting device to a receiving device over a communication network that performs bandwidth-reservation-type media access control.

REFERENCE CHARACTERS

1 transmitting device, 2 receiving device, 3 communication network, 4 video data signal source, 10 bandwidth reservation apparatus, 11 video data input unit, 12 transmit data buffer, 13 bit rate reporting unit, 14 first reserved bandwidth quantity calculating unit, 15 wireless communication unit, 16 second reserved bandwidth quantity calculating unit, 17 bandwidth reservation control unit, 18 clock.

What is claimed is:

1. In a communication system that transmits transmit data over a communication network that performs bandwidth-reservation media access control, a bandwidth reservation apparatus that reserves transmission bandwidth for transmitting the transmit data over the communication network, the bandwidth reservation apparatus comprising:

a transmit data buffer for temporarily storing the transmit data for an interval from a time when the transmit data are input to a time when the transmit data are transmitted to the communication network;

a bit rate reporter for reporting a bit rate of the transmit data; a first reserved bandwidth quantity calculator for calculating, from the bit rate of the transmit data, a first reserved bandwidth quantity required for transmission on the communication network;

a second reserved bandwidth quantity calculator for calculating a maximum bandwidth quantity that can be additionally reserved on the communication network as a second reserved bandwidth quantity that is additionally acquired so as to compensate for a shortage of transmission bandwidth that occurs during a bandwidth acquisition delay time from a time when the bit rate of the transmit data changes until the first reserved bandwidth quantity can be reserved; and a bandwidth reservation controller for reserving a combined reserved bandwidth quantity obtained by combining the first and second reserved bandwidth quantities.

2. The bandwidth reservation apparatus of claim 1, wherein the second reserved bandwidth quantity calculator is configured so as to:

request the bandwidth reservation controller to additionally reserve the second reserved bandwidth quantity during just a time interval obtained by dividing a value, calculated by integrating the shortage of transmission bandwidth over the bandwidth acquisition delay time, by the second reserved bandwidth quantity.

3. The bandwidth reservation apparatus of claim 1, wherein the second reserved bandwidth quantity calculator is configured so as to:

set a value obtained by multiplying the maximum bandwidth quantity that can be additionally reserved on the communication network by a predetermined percentage A, where 0<A<100, as the second reserved bandwidth quantity; and request the bandwidth reservation controller to additionally reserve the second reserved bandwidth quantity during just a time interval obtained by dividing a value, calculated by integrating the shortage of transmission bandwidth over the bandwidth acquisition delay time, by the second reserved bandwidth quantity.

4. The bandwidth reservation apparatus of claim 1, wherein the second reserved bandwidth quantity calculator is configured so as to:

calculate a predetermined quantity of bandwidth as the second reserved bandwidth quantity; and request the bandwidth reservation controller to additionally reserve the second reserved bandwidth quantity during just a time interval obtained by dividing a value, calculated by integrating the shortage of transmission bandwidth over the bandwidth acquisition delay time, by the second reserved bandwidth quantity.

5. In a communication system that transmits transmit data over a communication network that performs bandwidth-reservation media access control, a bandwidth reservation method that reserves transmission bandwidth for transmitting the transmit data over the communication network, the bandwidth reservation method comprising:

a step of temporarily storing the transmit data in a transmit data buffer for an interval from a time when the transmit data are input to a time when the transmit data are transmitted to the communication network;

a step of reporting a bit rate of the transmit data;

a step of calculating, from the bit rate of the transmit data, a first reserved bandwidth quantity required for transmission on the communication network;

a step of calculating a maximum bandwidth quantity that can be additionally reserved on the communication network as a second reserved bandwidth quantity that is additionally acquired so as to compensate for a shortage of transmission bandwidth that occurs during a bandwidth acquisition delay time from a time when the bit rate of the transmit data changes until the first reserved bandwidth quantity can be reserved; and a step of reserving a combined reserved bandwidth quantity obtained by combining the first and second reserved bandwidth quantities.

6. The bandwidth reservation method of claim 5, wherein the step of calculating the second reserved bandwidth quantity includes:

outputting a request to additionally reserve the second reserved bandwidth quantity during just a time interval obtained by dividing a value, calculated by integrating the shortage of transmission bandwidth over the bandwidth acquisition delay time, by the second reserved bandwidth quantity.

7. The bandwidth reservation method of claim 5, wherein the step of calculating the second reserved bandwidth quantity includes:

setting a value obtained by multiplying the maximum bandwidth quantity that can be additionally reserved on the communication network by a predetermined percentage A, where 0<A<100, as the second reserved bandwidth quantity; and outputting a request to additionally reserve the second reserved bandwidth quantity during just a time interval obtained by dividing a value, calculated by integrating the shortage of transmission bandwidth over the bandwidth acquisition delay time, by the second reserved bandwidth quantity.

8. The bandwidth reservation method of claim 5, wherein the step of calculating the second reserved bandwidth quantity includes:

calculating a predetermined quantity of bandwidth as the second reserved bandwidth quantity; and outputting a request to additionally reserve the second reserved bandwidth quantity during just a time interval obtained by dividing a value, calculated by integrating the shortage of transmission bandwidth over the bandwidth acquisition delay time, by the second reserved bandwidth quantity.

9. A communication apparatus comprising:

the bandwidth reservation apparatus of any claim 1; and a wireless communicator that the transmits the transmit data according to the combined reserved bandwidth quantity.

10. A communication system comprising: the communication apparatus of claim 9; and an access controller provided in the communication network.

* * * * *